UNITED STATES PATENT OFFICE.

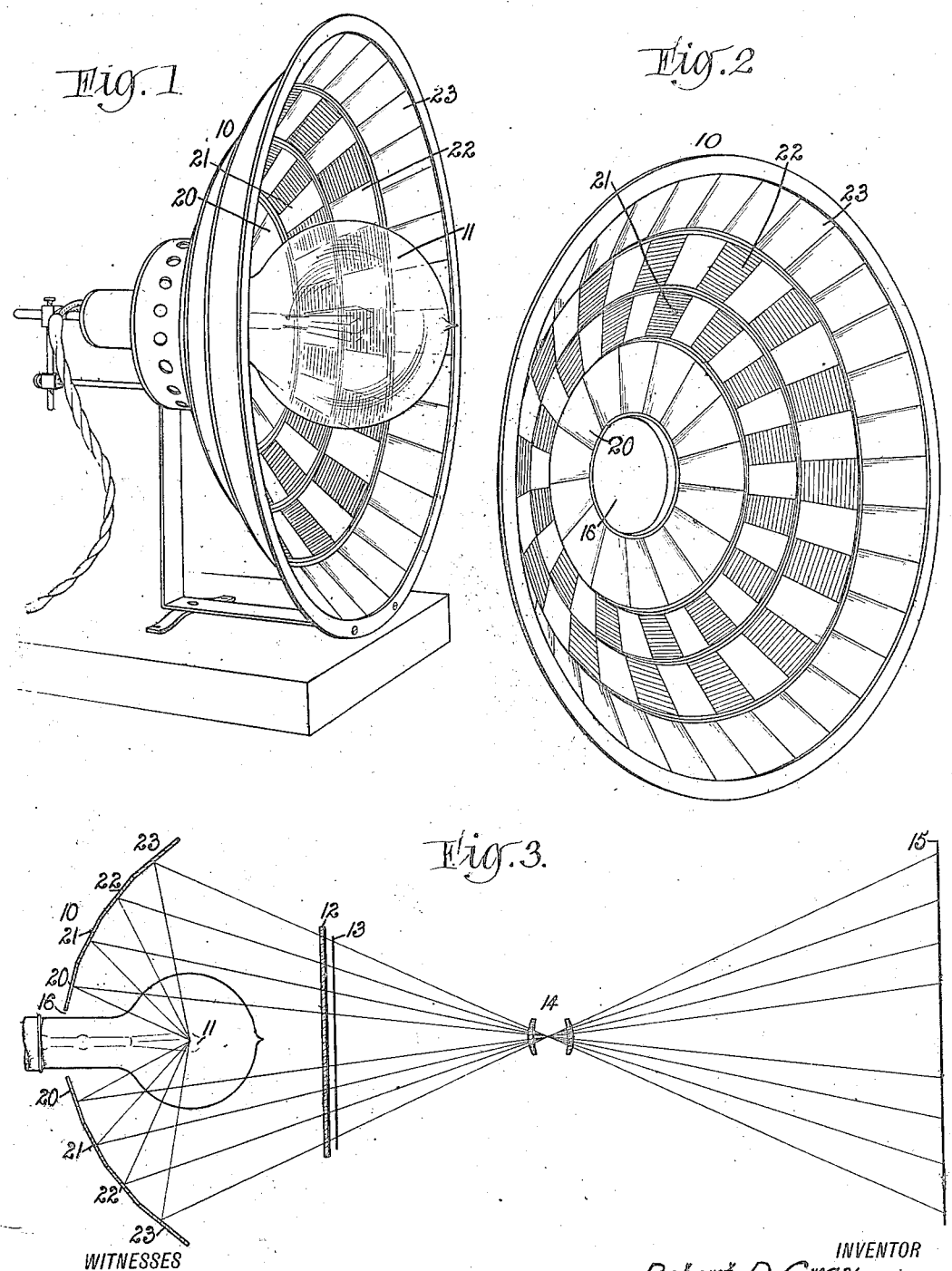

ROBERT D. GRAY, OF RIDGEWOOD, NEW JERSEY.

REFLECTING-CONDENSER FOR ENLARGING PHOTOGRAPHS.

1,253,813.

Specification of Letters Patent. Patented Jan. 15, 1918.

Application filed May 29, 1917. Serial No. 171,751.

*To all whom it may concern:*

Be it known that I, ROBERT D. GRAY, a citizen of the United States, and a resident of Ridgewood, in the county of Bergen and State of New Jersey, have invented a new and Improved Reflecting-Condenser for Enlarging Photographs, of which the following is a full, clear, and exact description.

The invention relates to apparatus for enlarging photographs with the aid of artificial light, and its object is to provide a new and improved reflecting condenser for enlarging photographs with the aid of a single source of artificial light, and arranged to insure a uniform illumination of the image thrown on the sensitized medium held on the screen or disk.

In apparatus of this type as heretofore constructed and used for converging artificial light from a single source so that it will pass through all parts of a negative and on through a projecting lens, it has been a common fault that the portions of the negative farthest from the center and axis of the apparatus appear less brilliantly lighted than the middle portion owing to the greater distance traversed by the rays of light which pass through such outer portions, and hence the image thrown on the screen is not as uniformly illuminated as it should be in order to obtain the best results. In order to overcome this defect use is made of a reflecting condenser having reflecting portions of varying intensity.

A practical embodiment of the invention is represented in the accompanying drawings forming a part of this specification, in which similar characters of reference indicate corresponding parts in all the views.

Figure 1 is a front perspective view of the mounted reflecting condenser;

Fig. 2 is a front perspective view of the reflecting condenser; and

Fig. 3 is a diagrammatic view of the apparatus for enlarging photographs by the aid of artificial light and provided with the improved reflecting condenser.

The apparatus for enlarging photographs consists of an improved reflecting condenser 10, a single source of artificial light 11, a diffuser 12 of ground glass or other material arranged in front of the reflecting condenser 10, with the negative 13 to be enlarged in front of the diffuser 12 and spaced from the lens 14 for throwing the enlarged image on the screen or disk 15. The source of light 11 is preferably in the form of an incandescent electric lamp, extending through an opening 16 formed centrally in the reflecting condenser 10, as plainly shown in Fig. 2.

The type of invention to which my improvement applies is a reflector composed of segmental plane mirrors in two or more rows such, for instance, as described in the Letters Patent of the United States, No. 1,133,955, granted to me March 30, 1915, but it is expressly understood that the present improvement may apply to other forms of reflectors such as spherical, parabolic, etc., and whether such reflectors have segmental plane surfaces or a continuous curve. As shown in Fig. 1, a series of concentric rows of mirrors 20, 21, 22, and 23 are provided, mounted on a suitable support and with the mirrors in the innermost and outermost rows 20 and 23 of a high reflecting power and with the mirrors in each of the rows 21 and 22 arranged alternately of higher and lower power, and with the mirrors in the row 21 staggered relatively to the mirrors in the row 22, as plainly indicated in Figs. 1 and 2. The higher power mirrors used are preferably provided with silvered backs, while those of lesser power may be sheet glass coated on the back with aluminum bronze, white paint, lead or tin foil, or the clear glass used without coating and the surface of the reflector case polished or painted of a desired reflecting power, with or without clear glass segments over these parts. White or opal glass may be used. Silvered mirrors may be reduced in reflecting power by the removal of portions of the coating in lines or dots or ground on one side. When alternated in a row the silvered reflectors alternating with the lesser power, the widths may be selected to produce the desired amount of light on particular parts of the projection. The innermost row of mirrors 20 is of high reflecting power to compensate for the blank opening 16 in the center of the reflecting condenser. As shown in Fig. 1, the mirrors in each row are radially disposed and uniformity is maintained in the spacing of all the mirrors in the several rows.

In using the apparatus, the rays of light from the source of light 11 are reflected by the rows of mirrors 20, 21, 22 and 23 and pass through the diffuser 12, which latter joins the light spots or images given by the mirror, thus producing a homogeneous light surface at the plane occupied by the negative 13. When light-spots from the view point of the lens 14 without a diffuser appear uniformly spaced apart, then the diffuser is interposed and an image of the whole projected in the usual manner. The illuminosity of parts of the screen 15 now corresponds with the nature or reflecting power of the segmental mirrors in alinement therewith, and these having been positioned in the reflector to compensate for the differences in light intensity received on their surfaces at different distances from the light source, it is evident that the entire surface of the projected image will be uniformly lighted. The lamp house and other parts of the apparatus (not shown) and used for holding negative, screen and lens should provide adjusting distance between reflector and negative in order that the negative and diffusing screen may be placed at a distance from the reflector at which the cone of light of the inner rows of mirrors close the aforesaid blank opening.

Having thus described my invention, I claim as new and desire to secure by Letters Patent:—

1. As an article of manufacture, a concave reflecting condenser having concentric rows of plane mirrors, the reflecting power of the outermost concentric row of plane mirrors exceeding that of the next inner row of plane mirrors.

2. As an article of manufacture, a concave reflecting condenser having a central opening and concentric rows of plane mirrors, of which the outermost and innermost rows of mirrors have a reflecting power in excess to the intermediate row of mirrors.

3. As an article of manufacture, a concave reflecting condenser having a central opening and concentric rows of plane mirrors, of which the outermost and innermost rows of mirrors have a reflecting power in excess of the intermediate row of mirrors, the intermediate row of mirrors being formed of two concentric sections with the mirrors in each section of alternate high and low reflecting power, the high reflecting power of these mirrors corresponding approximately to that of the mirrors of the inner and outer concentric row of mirrors.

4. As an article of manufacture, a concave reflecting condenser having concentric graduated portions, of which the outer concentric portion is of higher reflecting power than the adjacent concentric portions.

5. As an article of manufacture, a concave reflecting condenser having concentric reflecting portions each formed of segmental mirrors, the mirrors in the outermost and innermost concentric reflecting portions having uniform high reflecting power, and the mirrors of each intermediate concentric reflecting portion being alternately of high and low reflecting power.

6. As an article of manufacture, a concave reflecting condenser having a central opening and concentric outermost, innermost and intermediate reflecting portions, the reflecting power of the outermost and innermost portions exceeding that of the intermediate portions.

7. As an article of manufacture, a concave reflecting condenser having a central opening and concentric rows of mirrors, the reflecting power of the outermost and innermost rows of mirrors being approximately equal and exceeding that of the intermediate rows of mirrors.

ROBERT D. GRAY.